(12) United States Patent
Boersma et al.

(10) Patent No.: US 8,896,595 B2
(45) Date of Patent: *Nov. 25, 2014

(54) SYSTEM, APPARATUS, AND METHOD OF MODIFYING 2.5D GIS DATA FOR A 2D GIS SYSTEM

(71) Applicant: Intergraph Corporation, Madison, AL (US)

(72) Inventors: Michael Rodney Boersma, Harvest, AL (US); James Richard Stephens, Harvest, AL (US); David Milton Glenn, Madison, AL (US)

(73) Assignee: Intergraph Corporation, Madison, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/900,744

(22) Filed: May 23, 2013

(65) Prior Publication Data

US 2013/0257862 A1 Oct. 3, 2013

Related U.S. Application Data

(63) Continuation of application No. 12/722,983, filed on Mar. 12, 2010, now Pat. No. 8,525,827.

(51) Int. Cl.
*G06T 15/00* (2011.01)
*G06T 19/00* (2011.01)
*G06T 17/05* (2011.01)

(52) U.S. Cl.
CPC .............. *G06T 15/00* (2013.01); *G06T 19/00* (2013.01); *G06T 17/05* (2013.01)
USPC ........ 345/419; 715/848; 382/154; 340/995.1; 701/400

(58) Field of Classification Search
USPC ................... 345/423, 502; 709/217
See application file for complete search history.

(56) References Cited

U.S. PATENT DOCUMENTS

| 6,259,451 B1 | 7/2001 | Tesler ........................ 345/419 |
| 6,628,278 B1 | 9/2003 | Ritter ......................... 345/419 |
| 6,833,811 B2 * | 12/2004 | Zeitfuss et al. .......... 342/357.31 |

(Continued)

FOREIGN PATENT DOCUMENTS

CN 101621191 1/2010 ............... H02G 1/02

OTHER PUBLICATIONS

Harvey J. Miller et al., Discovering Geographic Knowledge in Data Rich Environments, Report of a Specialist Meeting held under the auspices of the Varenius Project, Oct. 8, 1999, 64 pages.

(Continued)

*Primary Examiner* — Phi Hoang
(74) *Attorney, Agent, or Firm* — Sunstein Kann Murphy & Timbers LLP

(57) ABSTRACT

Modifying 2.5D GIS data for a 2D GIS system involves displaying 3D graphic indicia on a display device, the graphic indicia being displayed in a geospatial manner as a function of 2.5D GIS data in a GIS database associated with a 2D GIS system, and further involves modifying the 2.5D GIS data in the GIS database using the 3D graphic indicia displayed on the display device, including mapping user selections relating to the 3D graphic indicia to 2D geo-location coordinates and modifying the 2.5D GIS data based on the 2D geo-location coordinates.

18 Claims, 6 Drawing Sheets

(56) References Cited

U.S. PATENT DOCUMENTS

| | | | |
|---|---|---|---|
| 7,188,072 | B2 | 3/2007 | Eichstaedt et al. ............... 705/7 |
| 7,200,564 | B2 | 4/2007 | Eichstaedt et al. ............... 705/8 |
| 7,692,649 | B2 * | 4/2010 | Elsberg et al. ............... 345/423 |
| 7,769,614 | B2 | 8/2010 | Eichstaedt et al. ............... 705/7 |
| 2005/0071135 | A1 | 3/2005 | Vredenburgh et al. ........... 703/1 |
| 2005/0071136 | A1 | 3/2005 | Vredenburgh et al. ........... 703/1 |
| 2005/0203718 | A1 | 9/2005 | Carek et al. ........................ 703/1 |
| 2005/0228703 | A1 | 10/2005 | Eichstaedt et al. ............... 705/7 |
| 2006/0004472 | A1 | 1/2006 | Eichstaedt et al. ............... 700/96 |
| 2007/0011271 | A1 * | 1/2007 | Baker et al. ...................... 709/217 |
| 2007/0025591 | A1 * | 2/2007 | Rhoads et al. ................... 382/100 |
| 2007/0067106 | A1 * | 3/2007 | Antoine ............................ 345/502 |
| 2007/0124335 | A1 * | 5/2007 | Park et al. ................... 707/104.1 |
| 2008/0013860 | A1 | 1/2008 | Blanco ............................ 382/285 |
| 2008/0111815 | A1 * | 5/2008 | Graves et al. ................... 345/420 |
| 2010/0238162 | A1 * | 9/2010 | Elsberg et al. ................... 345/419 |
| 2011/0016433 | A1 * | 1/2011 | Shipley ........................... 715/849 |
| 2011/0018865 | A1 | 1/2011 | Lee .................................. 345/419 |

OTHER PUBLICATIONS

International Searching Authority, International Search Report—International Application No. PCT/US2011/027674, dated Oct. 21, 2011, together with the Written Opinion of the International Searching Authority, 9 pages.

LV Jianjun et al. Comprehensive Simulation System Development based on Arc Objects and Vega, Journal of Wut (Information & Management Engineering), vol. 30, No. 3, Jun. 2008, 4 pages.

State Intellectual Property Office of China Search Report, Application No. 201180011623.3, dated May 15, 2014, 2 pages.

State Intellectual Property Office of China English Translation: Search Report, Application No. 201180011623.3, dated May 15, 2014, 2 pages.

State Intellectual Property Office of China Office Action, Application No. 201180011623.3, dated May 23, 2014, 4 pages.

State Intellectual Property Office of China English Translation: Office Action, Application No. 201180011623.3, dated May 23, 2014, 5 pages.

* cited by examiner

SYSTEM, APPARATUS, AND METHOD OF MODIFYING 2.5D GIS DATA FOR A 2D GIS SYSTEM

CROSS-REFERENCE TO RELATED APPLICATION(S)

This application is a continuation of, and therefore claims priority from, U.S. patent application Ser. No. 12/722,983 entitled INTEGRATED GIS SYSTEM WITH INTERACTIVE 3D INTERFACE filed on Mar. 12, 2010, which is hereby incorporated herein by reference in its entirety.

FIELD OF THE INVENTION

The present invention relates generally to an integrated GIS system and more specifically to an integrated GIS system in which a 3D visualization system is integrated with a 2D GIS system using interfaces that map 2D components for 3D visualization and map 3D components for processing by the 2D GIS system.

BACKGROUND OF THE INVENTION

Generally speaking, a Geographic Information System (GIS) is a system that allows for the capture, storage, analysis, management, and presentation of location-based data for a variety of applications. Among other things, a GIS typically allows users to create interactive queries, analyze spatial information, edit data, and create maps. A good overview of GIS technology and products can be found in WIKIPEDIA™ at http://en.wikipedia.org/wiki/Geographic_information_system, the content of which is hereby incorporated herein by reference in its entirety.

Many GIS products provide for two-dimensional (2D) visualization and manipulation of geographic information based on so-called "2.5D" data. As opposed to 3D data, which includes information for 3D representation and manipulation of geographic information, 2.5D data essentially includes two-dimensional coordinates (e.g., X and Y coordinates) plus elevation information. For example, GIS data for a building might include coordinates representing the building's perimeter plus elevation information. 2D maps produced from the 2.5D data are typically top-down views of a landscape and may include contour lines or shading to represent elevation.

3D visualization products can be used to produce 3D maps from the 2.5D data, but this often involves exporting the 2.5D data, converting the 2.5D data into a form that can be input to a separate 3D visualization product, and then running the 3D product to provide the 3D visualization. Such 3D visualization is typically quite static, essentially providing a snapshot of the 2.5D data. If the user wants to make a change and visualize it in 3D, the user typically edits the 2.5D data in the 2D domain, exports the edited 2.5D data, converts the edited 2.5D data, and runs the 3D product to visualize the change.

The following is an example of how a 2D GIS system and external 3D to visualization product might be used to determine a location at which a person or camera should be located. First, using the 2D GIS system, the user may select a first location X and visualize the location X in a 2D window, which essentially shows a top-down view of location X with contour lines to represent elevation. In order to visualize the location X in 3D, the geo-location information is packaged into a file and exported to the 3D visualization product. This process may be repeated a number of times using different locations until an appropriate location is found. As can be imagined, such an iterative process is inefficient.

Some of the GIS companies (and products) include Autodesk (e.g., AutoCAD Map 3D™), Bentley Systems (e.g., Powermap™), ESRI (e.g., ArcGIS™), GeoVirtual (e.g., GeoShow3D™), Intergraph (e.g., GeoMedia™), MultiVision (e.g., MultiVision 3D Plus™), Manifold Systems (e.g., Manifold System™), PitneyBowes (e.g., Mapinfo™), GE Energy (e.g., Smallworld™), and ERDAS (e.g., Imagine™). There are also open source products such as GRASS or uDig, public access to geographic information (e.g., Google Earth™ and interactive web mapping), and, of course, custom products.

SUMMARY OF THE INVENTION

Embodiments of the present invention integrate 2.5D GIS information maintained by a 2D GIS system with the 3D information and 3D rendering capabilities of the 3D rendering engine to provide an integrated GIS system having an interactive 3D interface. In essence, the system inserts GIS information into the 3D rendering in the 3D window and allows the user to manipulate the 3D graphic indicia and other information contained in the 3D window by intercepting user inputs and converting them for use by the 2D GIS system. The 2D GIS system can determine where in the 3D window the user is working and therefore can determine corresponding 2D geo-location coordinates for use in core 2D GIS functions performed through the 3D window.

In accordance with one aspect of the invention there is provided a method of integrating a 3D visualization system into a 2D GIS system. The method involves providing an interface between the 2D GIS system and the 3D visualization system; providing, by the interface, GIS information received from the 2D GIS system to the 3D visualization system; providing, by the interface, 3D rendering data from the 3D visualization system to the 2D GIS system; producing, by the 2D GIS system, a display in a 3D window on a display device including 3D graphic indicia from the 3D rendering data and GIS information from the 2D GIS system, the 3D graphic indicia being displayed in a geospatial manner as a function of the GIS information; and mapping, by the interface, user sections made in the 3D window to corresponding 2D geo-location coordinates for use by the 2D GIS system.

In accordance with another aspect of the invention there is provided an integrated GIS system comprising a client 2D GIS system, a 3D visualization system, and an interface between the 2D GIS system and the 3D visualization system. The interface is configured to provide GIS information received from the 2D GIS system to the 3D visualization system and to provide 3D rendering data from the 3D visualization system to the 2D GIS system for display in a 3D window on a display device including 3D graphic indicia from the 3D rendering data and GIS information from the 2D GIS system, the 3D graphic indicia being displayed in a geospatial manner as a function of the GIS information. The interface is further configured to map user selections made in the 3D window to corresponding 2D geo-location coordinates for use by the 2D GIS system.

In various alternative embodiments, 3D graphic indicia displayed on the display device may be used to change the GIS information in the 2D GIS system. The GIS information may be changed by modifying at least a portion of the 3D graphic indicia on the display device and modifying a corresponding portion of the GIS information in the 2D GIS system. This may involve, for example, receiving a message indicating that at least a portion of the 3D graphic indicia has been changed, the message having change information relating to the change of the 3D graphic indicia; and in response to receipt of the message, modifying the GIS information based on the change information of the message. The GIS information may be changed substantially in real time as the 3D graphic indicia is modified. Changing the GIS information may involve changing existing information and/or adding additional information. The 3D graphic indicia may include a three-dimensional visualization display of the GIS information, and using the 3D graphic indicia may involve utilizing an input device to select or add graphic objects to the three-dimensional visualization display. The 3D graphic indicia may include a three-dimensional visualization of terrestrial features.

In accordance with yet another aspect of the invention there is provided a method of modifying GIS data. The method involves displaying 3D graphic indicia on a display device, the graphic indicia being displayed in a geospatial manner as a function of GIS data in a GIS database; and modifying the GIS data in the GIS database using the 3D graphic indicia displayed on the display device, including mapping user selections relating to the 3D graphic indicia to 2D geo-location coordinates and modifying the GIS data based on the 2D geo-location coordinates.

In various alternative embodiments, modifying the GIS data may involve receiving a message indicating that at least a portion of the 3D graphic indicia has been changed, the message having change information relating to the change of the 3D graphic indicia; and in response to receipt of the message, modifying the GIS data in the database based on the change information of the message.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions

Figure 1:
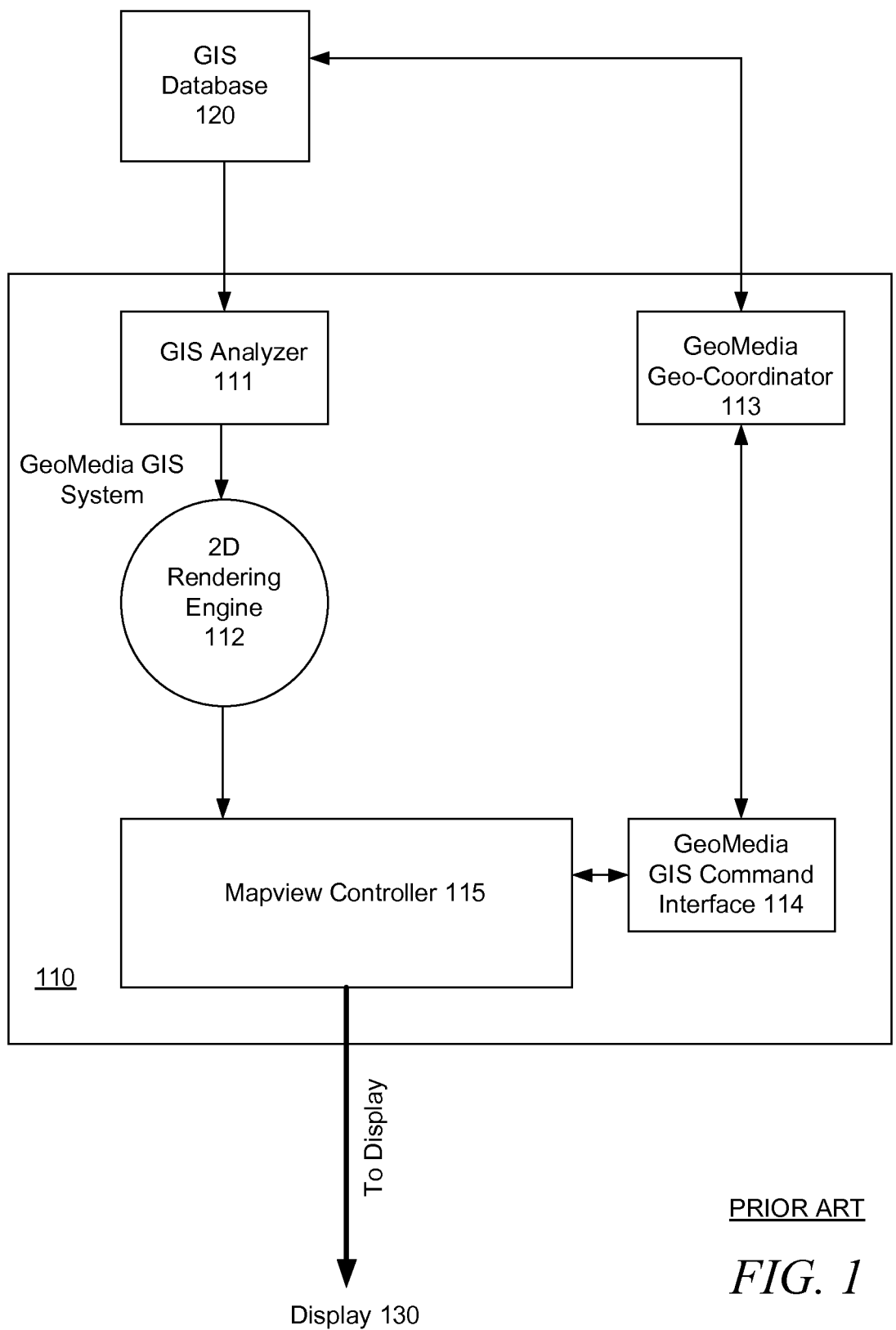
FIG. 1 is a schematic block diagram showing relevant components of the GeoMedia™ GIS system, in accordance with an exemplary embodiment of the present invention.

As used in this description and the accompanying claims, the following terms shall have the meanings indicated, unless the context otherwise requires:

2.5D GIS data is geospatial data that is two-dimensional in nature (e.g., polyline, polygon, point, etc.) but each coordinate is represented by an X, Y, and Z value, where the Z value represents elevation/height. GIS data may include such things as location, elevation, precincts, districts, counties, roadways, building, water pressure readings, etc. Each element may have associated metadata. For example, a road might be associated with a road name, direction, starting/ending addresses, road type (e.g., dirt vs. paved), etc. 2.5D GIS data may include image data (e.g., raster data) that can be overlayed onto or draped over components of a geographical rendering.

A 2D GIS system or visualization tool is a GIS system that processes 2.5D GIS data for visualization, placement, editing, and analysis using essentially 2D views. A 2D view may include representations of elevation such as contour lines or shading. A 2D GIS system typically has the ability to add and remove 2.5D GIS data with associated symbology, the ability to assign identity to data added to the visualization tool, the ability to find data held by the visualization tool given an identity, the ability to know when a change has been made, and the ability to convert canvas coordinates to geospatial coordinates and vice versa. As opposed to merely allowing for visualization of the 2.5D GIS data, the 2D GIS system allows the user to work on the 2.5D GIS data itself, for example, by entering queries and by editing the data. Examples of analytics in a 2D GIS system include determination of a best route to various addresses and evaluation of water pressure at various fire hydrants.

In embodiments of the present invention, a 3D visualization/rendering product is integrated with a 2D GIS system to provide an interactive 3D interface through which GIS functions can be performed. It is understood that a 3D GIS product can be developed from scratch or a 2D product can be modified to implement 3D GIS functionality, but such solutions would be costly and would take a long time to develop. Embodiments of the present invention provide a solution that can be implemented quickly, specifically by implementing various interfaces between the 2D GIS system and the 3D visualization/rendering product that convert 2.5D data from the 2D GIS system for use by the 3D visualization/rendering product and converting 3D visualization components (e.g., a location selected in a 3D view) into 2D visualization components for processing by the 2D GIS product.

In one specific embodiment, a 3D rendering product such as the TerraExplorer™ product sold by Skyline Software Systems, Inc. of Chantilly, Va. is integrated with the GeoMedia™ GIS products sold by Intergraph Corporation of Huntsville, Ala., although it should be noted that other 3D products may be integrated with the GeoMedia™ or other GIS products based on the teachings below.

FIG. 1 is a schematic block diagram showing relevant components of the GeoMedia™ GIS system 110, in accordance with an exemplary embodiment of the present invention. Among other things, the GIS system 110 includes a GIS analyzer 111, a 2D rendering engine 112, a geo-coordinator 113, a GIS command interface 114, a mapview controller 115, and a GIS database 120 that stores 2.5D GIS data and metadata. Generally speaking, when the user selects a geographic area to view via the GIS command interface 114 (e.g., by entering a query, such as to locate segments that relate to a specified roadway), the geo-coordinator 113 determines what types of information are needed to render the selected geographic area. In response to the geo-coordinator 113, the GIS database 120 sends the relevant information to the GIS analyzer 111. The GIS analyzer 111 processes the GIS data received from the GIS database 120 and provides data to the 2D rendering engine 112 from which the selected geographical area can be rendered. The mapview controller 115 receives the output of the 2D rendering engine 112 and displays the rendering in a display window on the display 130.

Among other things, the mapview controller 115 handles operations performed through 2D geographic views. Specifically, when the user makes a selection in a 2D view, the mapview controller 115 maps the user selection to specific 2D geo-location coordinates. Based on the 2D geo-location coordinates, the mapview controller 115 can obtain appropriate 2.5D GIS data and metadata through the GIS command interface 114 and geo-coordinator 113 for satisfying the user's selection. As the user manipulates information within the display window, the 2.5D data in the GIS database 120 and the rendering are updated as appropriate.

For example, if the user clicks at a specific location within the 2D view such as on a specific component such as a road or building, the mapview controller 115 may obtain metadata associated with the selected location and display the metadata, e.g., in a separate window overlayed onto the 2D view. The user may edit the metadata, in which case the modified metadata may be stored in the GIS database 120 and the 2D rendering may be updated to reflect the modified information.

As discussed above, 3D visualization products can be used to produce 3D maps from the 2.5D GIS data, but this often involves exporting the 2.5D GIS data, converting the 2.5D GIS data into a form that can be input to a separate 3D visualization product, and then running the 3D product to provide the 3D visualization. Such 3D visualization is typically quite static, essentially providing a snapshot of the 2.5D GIS data. If the user wants to make a change and visualize it in 3D, the user typically makes changes in a 2D window, exports the resulting modified 2.5D GIS data, converts the modified 2.5D GIS data, and runs the 3D visualization product to visualize the change.

In embodiments of the present invention, a 3D visualization product is integrated into the 2D GIS system not only to provide 3D rendering but also to provide a 3D interface through which GIS functions can be performed. In exemplary embodiments of the present invention, users of the system can open a 3D window, e.g., from an existing 2D GIS system window, in which case the 3D window displays a 3D view of a selected portion of the geometry. The user can then work from within the 3D window in a manner similar to working in the 2D window. The integrated system leverages the 2D functionality of the client GIS system in combination with the 3D rendering capability of the 3D visualization product to provide 3D GIS functionality, without having to substantially modify the existing client GIS system. In this way, 3D support can be added to the existing client GIS system rather than developing a 3D system from scratch.

Figure 2:
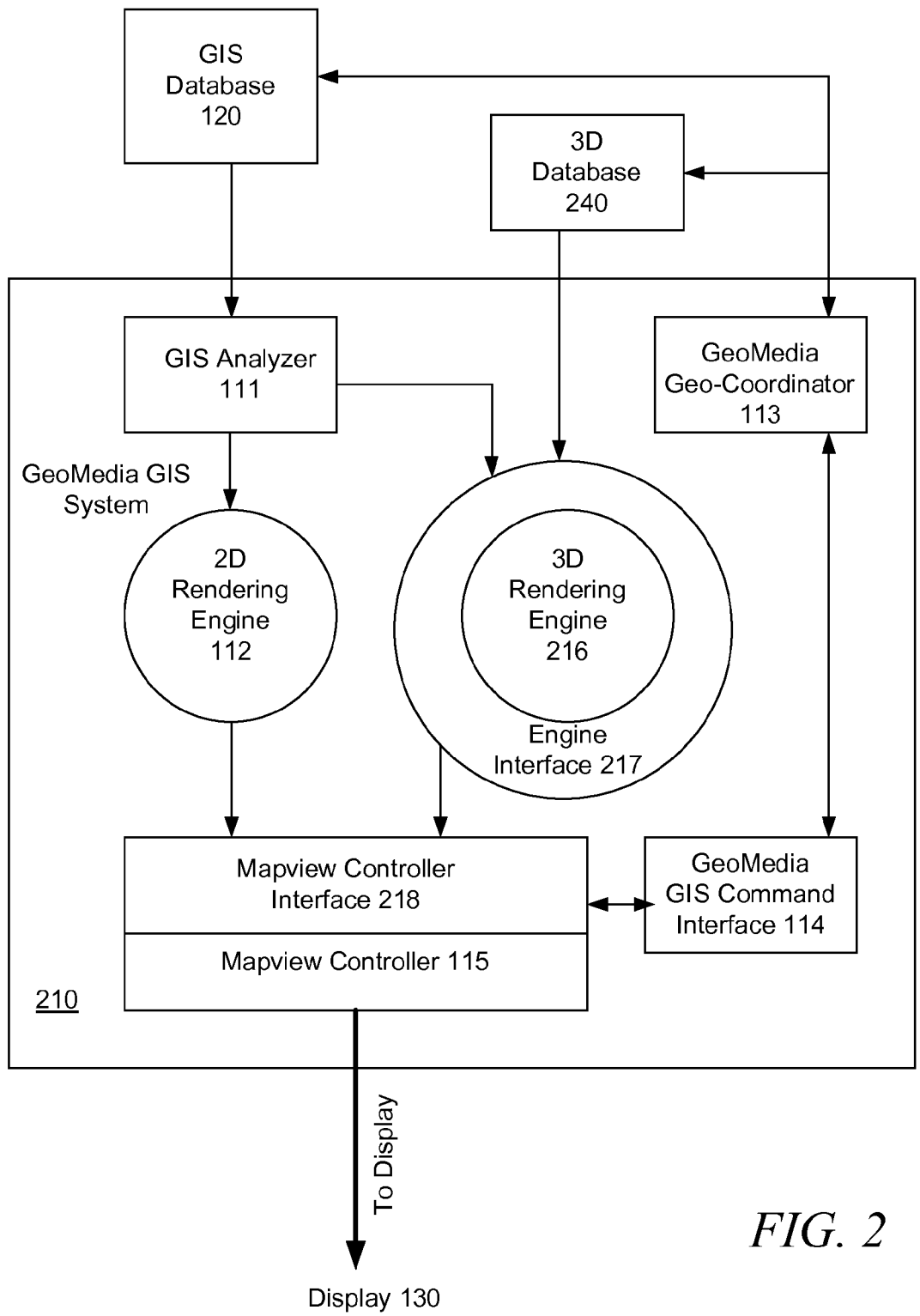
FIG. 2 is a schematic block diagram showing relevant components of the integrated GIS system in accordance with an exemplary embodiment of the present invention.

FIG. 2 is a schematic block diagram showing relevant components of the integrated GIS system 210 in accordance with an exemplary embodiment of the present invention. Among other things, the GIS system 210 includes GIS analyzer 111, 2D rendering engine 112, geo-coordinator 113, GIS command interface 114, mapview controller 115, 3D rendering engine 216, 3D rendering engine interface 217, and mapview controller interface 218. The engine interface 217 and the mapview controller interface 218 allow the client GIS system to interface with the 3D rendering engine 216 and perform GIS functions without requiring substantial changes to the client GIS system, essentially hiding details of the underlying 3D rendering engine 216 from the standard client GIS commands and allowing the client GIS system to interactively process the data that is being manipulated in 3D windows. Thus, components of the client GIS system such as the GIS analyzer 111, 2D rendering engine 112, geo-coordinator 113, GIS command interface 114, and mapview controller 115 are substantially the same as in the GIS system 110 shown and described with reference to FIG. 1.

The engine interface 217 exposes functionality unique to the 3D rendering engine 216, such as the ability to define the terrain (specific to a 3D view) and the ability to "fly a route," without the client GIS system having to know or understand the 3D rendering engine components that are exposed. The engine interface 217 receives the same output from the GIS analyzer 111 as the 2D rendering engine 112 and produces a data set for the 3D rendering engine 216 based on the vector-based data from the client GIS system and 3D data from the 3D database 240. Using this data set, the engine interface 217 interacts with the 3D rendering engine 216 to carry out 3D rendering and pass rendering data to the mapview controller interface 218. The engine interface 217 interfaces with the 3D rendering engine 217 via an application program interface (API) of the 3D rendering engine 216. In an exemplary embodiment, the 3D rendering engine 216 is the TerraExplorer™ 3D product sold by Skyline Software Systems, Inc. of Chantilly, Va. The TerraExplorer API Reference Guide is available online at http://www.skylinesoft.com/SkylineGlobe/Corporate/Developer/api.aspx; the contents of the TerraExplorer API Reference Guide are hereby incorporated herein by reference in their entirety.

The mapview controller interface 218 is an interface between the rendering engines (i.e., the 2D rendering engine 112 and the engine interface 217) and the mapview controller 115. The mapview controller interface 218 isolates the mapview controller 115 from any impact to the existing client rich GIS (GeoMedia product family) command set. This allows the client GIS system to interact with the 3D rendering engine 216 in essentially the same way that it interacts with the original 2D rendering engine 112. In this embodiment, the client GIS system does not understand true 3D geometry the way a full 3D GIS system does. However, 3D visualization components are mapped to 2D representations to allow the client GIS to execute its commands.

The mapview controller interface 218 receives rendering data from both the 2D rendering engine 112 and the engine interface 217 and essentially acts as a switch, passing the appropriate rendering data to the mapview controller 115. If the user is working in a 2D window, then the mapview controller interface 218 passes rendering data from the 2D rendering engine 112 to the mapview controller 115. If the user is working in a 3D window, then the mapview controller interface 218 passes rendering data from the engine interface 217 to the mapview controller 115.

As discussed above, in exemplary embodiments of the present invention, users of the system 210 can work from within the 3D window in a manner similar to working in the 2D window. The mapview controller interface 218 essentially intercepts actions that the user is taking in the 3D window, such as selecting a component or editing information for a component, and converts such actions into the 2D realm in which the client GIS system operates. The client GIS system then performs functions in essentially the same way as if the action had been initiated in a 2D window.

When the user selects a geographic area to view via the GIS command interface 114, the geo-coordinator 113 determines what types of information are needed to render the selected geographic area. In response to the geo-coordinator 113, the GIS database 120 sends the relevant information to the GIS analyzer 111, and the output of the GIS analyzer 111 is passed to both the 2D rendering engine 112 and the engine interface 217. Also in response to the geo-coordinator 113, the 3D database 240 sends relevant information to the engine interface 217. The engine interface 217 produces an input dataset for the 3D rendering engine 216 based on the output of the GIS analyzer 111 and the information received from the 3D database 240 and interacts with the 3D rendering engine 216 via the API to carry out 3D rendering, as discussed above. As discussed above, the mapview controller interface 218 receives rendering data from both the 2D rendering engine 112 and the engine interface 217 and essentially acts as a switch, passing the appropriate rendering data to the mapview controller 115. The mapview controller 115 displays the rendering in a 3D display window on the display 130.

Because the mapview controller 115 operates in the 2D realm, selections made in a 3D window are converted by the mapview controller interface 218 into 2D components that can be processed by the mapview controller 115. Specifically, when the user makes a selection in a 3D view, the mapview controller interface 218 maps the user selection to specific 2D geo-location coordinates by essentially carving through the 3D rendering at the click location to identify wherein in the 2D world the click occurred. Based on the 2D geo-location coordinates, the mapview controller 115 can obtain appropriate 2.5D GIS data and metadata through the GIS command interface 114 and geo-coordinator 113 for satisfying the user's selection. As the user manipulates information within the 3D display window, the GIS database 120 and the 3D database are updated as appropriate, and the 3D rendering is updated as appropriate to reflect the changes.

For example, if the user clicks at a specific location within the 3D view such as at the top of a mountain, the mapview controller interface 218 determines the corresponding 2D geo-location coordinates and passes those coordinates to the mapview controller 115, which may obtain metadata associated with the selected location and display the metadata, e.g., in a separate window overlayed onto the 3D view. The user may edit the metadata, in which case the modified metadata may be stored in the GIS database 120 and the 3D rendering may be updated to reflect the modified information.

Thus, embodiments of the present invention integrate 2.5D GIS information maintained by the client GIS system with the 3D information and 3D rendering capabilities of the 3D rendering engine to provide an interactive 3D GIS system. In essence, the system inserts GIS information into the 3D rendering in the 3D window and allows the user to manipulate the 3D graphic indicia and other information contained in the 3D window by intercepting user inputs and converting them for processing by the client GIS system. The client GIS system can determine where in the 3D window the user is working and therefore can determine corresponding 2D geo-location coordinates for use in core 2D GIS functions performed through the 3D window.

For example, just as a 2D window might include metadata such as road names, road directions, and road types (e.g., dirt vs. paved), such metadata may be included in a 3D window by effectively overlaying the metadata onto the 3D rendering. As discussed above, the native GIS system typically allows the user to configure the types of metadata that are displayed in a particular view, and this configuration is carried over to the 3D window environment so that the user sees in the 3D window the same types of metadata that would be seen in a corresponding 2D window.

Similarly, just as in a 2D window, the user can select (e.g., click on) an item in the 3D window, such as a road or building, and the system displays the associated metadata for the selected item to the degree configured by the user, e.g., in a separate window through which the user can modify the information. Again, this metadata is effectively overlayed onto the 3D rendering.

Furthermore, just as in a 2D window, the user can make changes to the 3D graphic indicia and/or metadata from within the 3D window (e.g., modify existing data or add additional data), and the user inputs are intercepted by the system and implemented, for example, by modifying the 2.5D GIS data (and optionally modifying the 3D data) as needed to reflect the changes and then generating an updated 3D rendering based on the modified data to reflect the changes. Thus, when the user modifies a portion of the 3D graphic indicia (e.g., the user deletes a component) or metadata (e.g., the user edits the height of a building) on the display device, the system receives a message including change information relating to the change, and the system modifies a corresponding portion of the GIS information in the GIS database (and optionally modifies a corresponding portion of 3D data) based on the change information in the message substantially in real time as the modification. The modified data is fed to the 3D rendering engine via the engine interface to produce modified 3D rendering incorporating the changes.

It should be noted that, in one specific embodiment, information from the 3D database may be used to produce 3D renderings, but the 3D data in the 3D database is not modified when changes are made via a 3D window. In alternative embodiments, however, the 3D data in the 3D database may be modified.

In this way, a user who is familiar with the 2D GIS system and its various commands and controls can easily utilize 3D windows to obtain the same types of information and perform the same types of operations that would be available in a corresponding 2D window while also providing additional 3D functionality such as the ability to perform so-called fly-throughs in the 3D space.

At any given time, the user may be viewing geographic data in a 2D window, a 3D window, or both a 2D window and a 3D window (i.e., with two windows open at the same time). In this latter case, actions taken in one window may be reflected in both windows essentially in real time. For example, if the user selects a particular element displayed in the 3D window, then the system may highlight the element and/or display relevant metadata for the selected element in both windows. Similarly if the user makes a change in the 3D window, the system may provide updated 2.5D information to both the 2D and 3D rendering engines and update each window according to the output of the corresponding rendering engine. It should be noted that, particularly due to the 3D graphical nature of the 3D displays, elements that are "visible" in the 2D display may not be visible in the 3D display and vice versa, so selection or modification of such elements may effectuate a change in one display but not the other (e.g., if the user were to select a building in the 2D window that is hidden by a mountain in the 3D window, then the building may be highlighted in the 2D window with no impact to the 3D window). Alternatively, the system may change the viewing angle in a window to bring the selected and previously hidden element into view.

Figure 3:
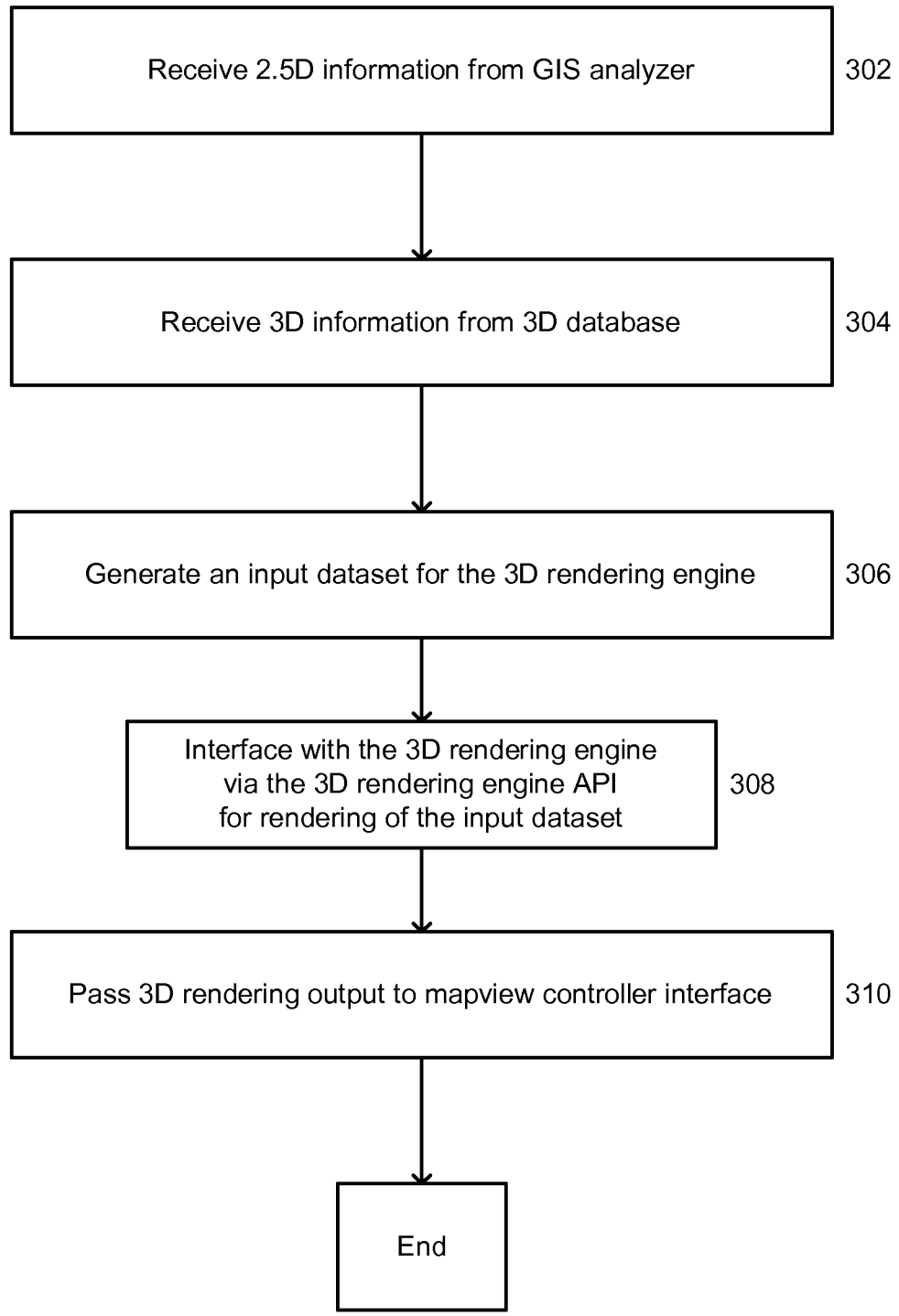
FIG. 3 is a logic flow diagram schematically describing functionality of the engine interface, in accordance with an exemplary embodiment of the present invention.

FIG. 3 is a logic flow diagram schematically describing functionality of the engine interface, in accordance with an exemplary embodiment of the present invention. In block 302, the engine interface receives 2.5D information from the GIS analyzer. In block 304, the engine interface receives 3D information from the 3D database. In block 306, the engine interface generates an input dataset for the 3D rendering engine. In block 308, the engine interface interfaces with the 3D rendering engine via the 3D rendering engine API for rendering of the input dataset. In block 310, the engine interface passes 3D rendering output to the mapview controller interface for display in a 3D window.

Figure 4:
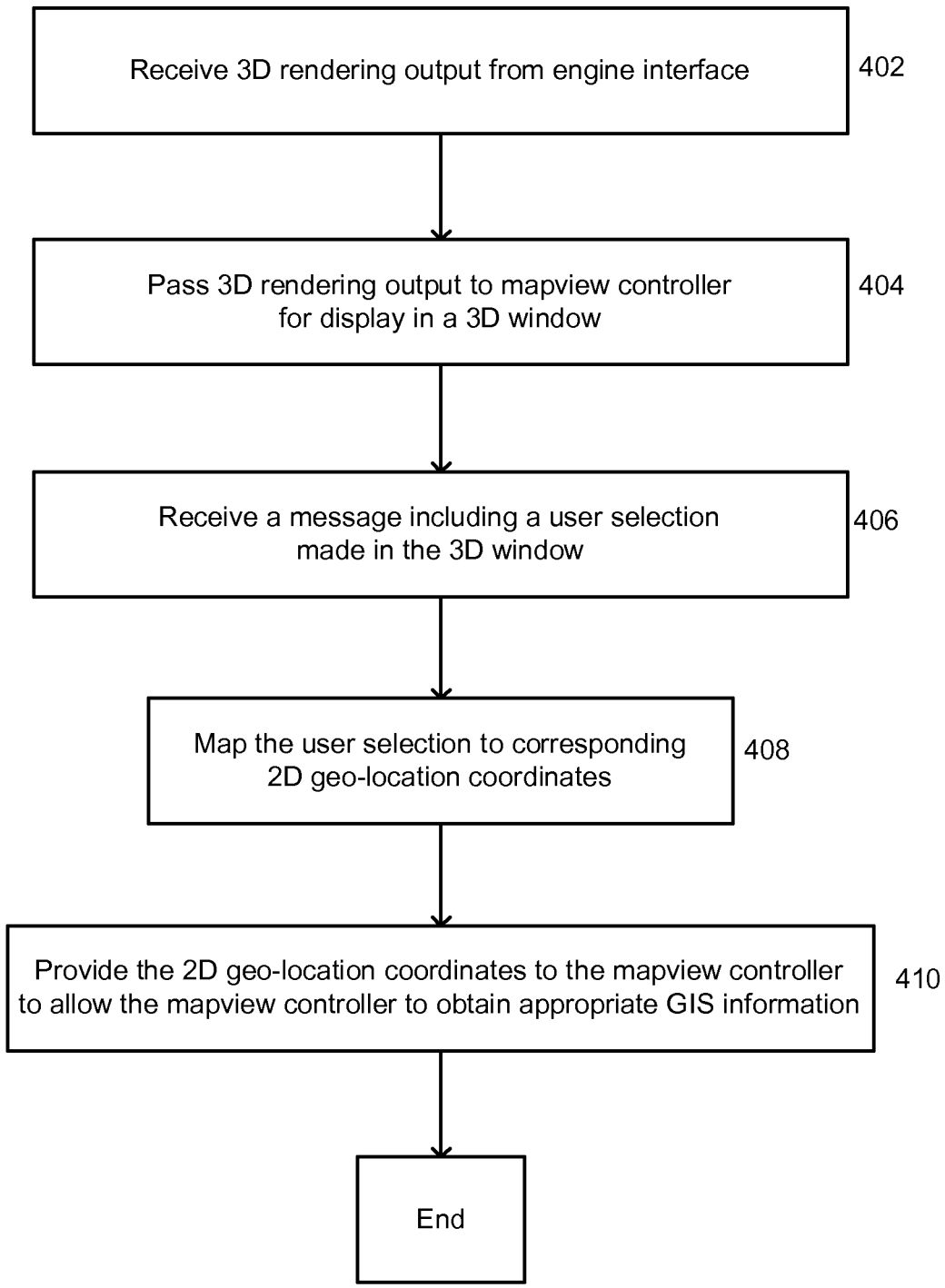
FIG. 4 is a logic flow diagram schematically describing functionality of the mapview controller interface, in accordance with an exemplary embodiment of the present invention.

FIG. 4 is a logic flow diagram schematically describing functionality of the mapview controller interface, in accordance with an exemplary embodiment of the present invention. In block 402, the mapview controller interface receives the 3D rendering output from the engine interface. In block 404, the mapview controller interface passes the 3D rendering output to the mapview controller for display in a 3D window. In block 406, the mapview controller interface receives a message including a user selection made in the 3D window. In block 408, the mapview controller interface maps the user selection to corresponding 2D geo-location coordinates. In block 410, the mapview controller interface provides the 2D geo-location coordinates to the mapview controller to allow the mapview controller to obtain appropriate GIS information for acting on the user selection.

Figure 5:
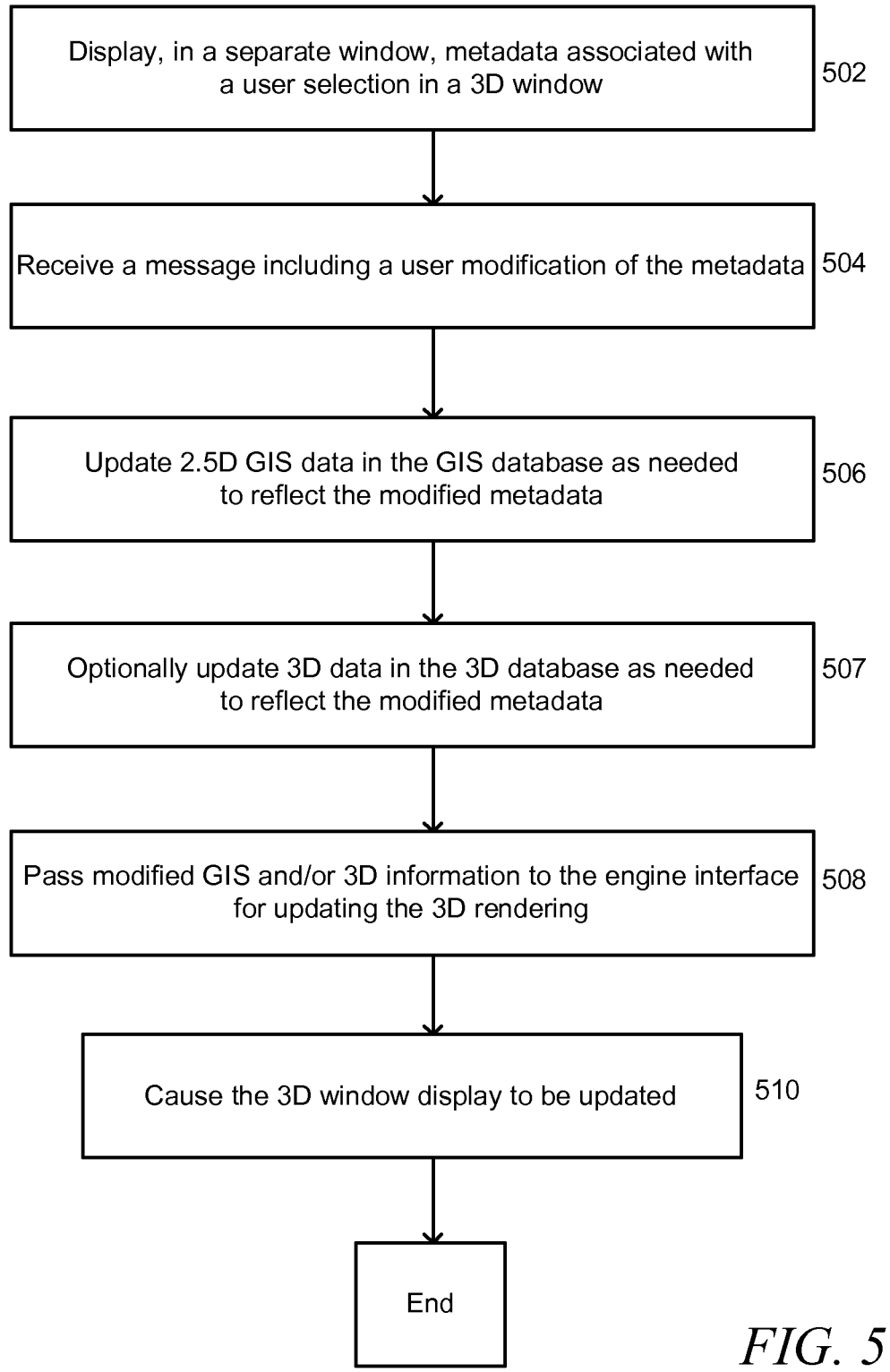
FIG. 5 is a logic flow diagram schematically describing functionality of the integrated GIS system for editing metadata via a 3D window, in accordance with an exemplary embodiment of the present invention.

FIG. 5 is a logic flow diagram schematically describing functionality of the integrated GIS system for editing metadata via a 3D window, e.g., based on 2D geo-location coordinates determined by the mapview controller interface, in accordance with an exemplary embodiment of the present invention. In block 502, the system displays, in a separate window, metadata associated with a user selection in a 3D window. In block 504, the system receives a message including a user modification of the metadata. In block 506, the system updates 2.5D data in the GIS database as needed to reflect the modified metadata. In block 507, the system optionally updates 3D data in the 3D database as needed to reflect the modified metadata. In block 508, the system passes modified GIS and/or 3D information to the engine interface as appropriate for updating the 3D rendering. In block 510, the system causes the 3D window display to be updated as appropriate so as to reflect the edited metadata.

Figure 6:
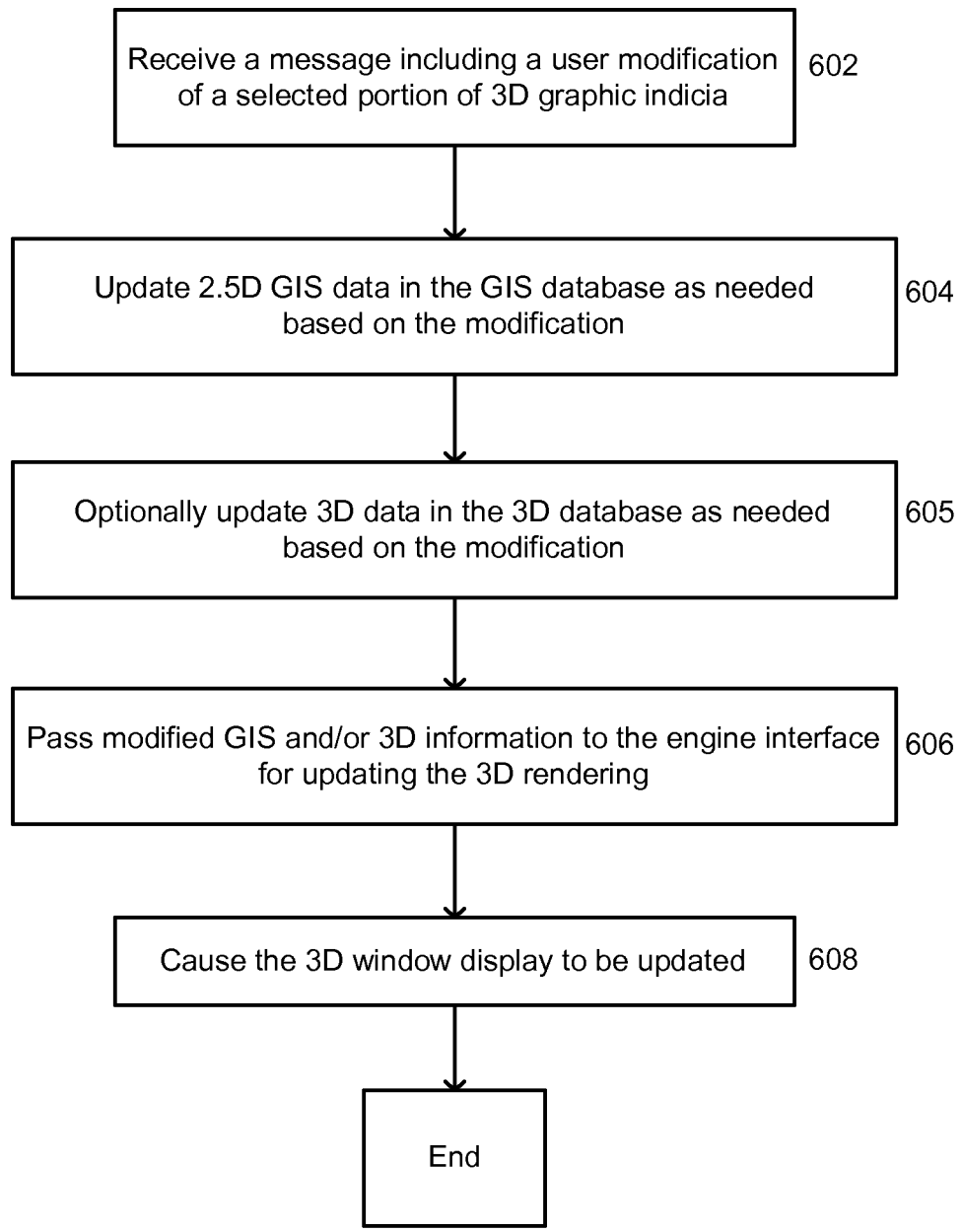
FIG. 6 is a logic flow diagram schematically describing functionality of the integrated GIS system for using 3D graphic indicia displayed on the display device to change the GIS data in the GIS database, in accordance with an exemplary embodiment of the present invention.

FIG. 6 is a logic flow diagram schematically describing functionality of the integrated GIS system for using 3D graphic indicia displayed on the display device to change the GIS data in the GIS database, e.g., based on 2D geo-location coordinates determined by the mapview controller interface, in accordance with an exemplary embodiment of the present invention. In block 602, the system receives a message including a user modification of a selected portion of 3D graphic indicia. In block 604, the system updates 2.5D data in the GIS database as needed based on the modification. In block 605, the system optionally updates 3D data in the 3D database as needed based on the modification. In block 606, the system passes modified GIS and/or 3D information to the engine interface as appropriate for updating the 3D rendering. In block 608, the system causes the 3D window display to be updated as appropriate so as to reflect the edited 3D graphic indicia.

It should be noted that the integration solution described herein provides a migration path for incorporating 3D GIS support into a 2D GIS product. Specifically, the integrated GIS system shown in FIG. 2 can be modified over time by combining, replacing and/or adding various components. Such modifications may be made in stages. For example, the GIS and 3D databases may be combined into a common database, with appropriate changes made to other system components. Also, existing GIS commands may be modified for 3D (i.e., volumetric) support to provide enhanced processing of 3D information. Support for other engines may be added essentially by implementing an engine interface for a new engine and updating the mapview controller interface to accommodate the new engine interface. Other modifications/enhancements may be made essentially on a component-by-component basis.

Thus, embodiments of the present invention do not merely internalize the prior art approach of converting GIS data, exporting it, and running the 3D rendering engine. Rather, embodiments of the present invention integrate 2.5D GIS and 3D information for two-way visualization, placement, analysis, and editing. Specifically, 2.5D GIS information and 3D information are combined to produce 3D renderings through which the user can perform various visualization, placement, analysis, and editing tasks. GIS data (and optionally 3D data) as well as 3D renderings are updated substantially in real-time with any additions and changes made through 3D windows.

It should be noted that the engine interface 217 and the mapview controller interface 218 are depicted and described as separate entities but are not necessarily implemented separately from one another and are not necessarily implemented separately from the 2D GIS system components. Rather, the engine interface 217 and the mapview controller interface 218 represent an overall interface between the 2D GIS system components and the 3D visualization system components that allows for implementation of the described functionality, without having to substantially modify either the 2D GIS system components or the 3D visualization system components.

It should be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of modifying 2.5D GIS data for a 2D GIS system, the method comprising:
   displaying 3D graphic indicia produced by a 3D rendering engine on a display device, the graphic indicia being displayed by the 2D GIS system that receives the 3D graphic indicia from the 3D rendering engine, the graphic indicia being displayed in a geospatial manner as a function of 2.5D GIS data in a GIS database associated with the 2D GIS system; and
   modifying the 2.5D GIS data in the GIS database using the 3D graphic indicia displayed on the display device, including mapping user selections relating to the 3D graphic indicia to 2D geo-location coordinates for the 2D GIS system and modifying the 2.5D GIS data by the 2D GIS system based on the 2D geo-location coordinates.

2. The method according to claim 1, wherein displaying 3D graphic indicia on a display device comprises:
   providing an interface between the 2D GIS system and a 3D visualization system;
   providing, by the interface, GIS information received from the 2D GIS system to the 3D visualization system;
   providing, by the interface, 3D rendering data from the 3D visualization system to the 2D GIS system; and
   producing, by the 2D GIS system, a display in a 3D window on a display device including 3D graphic indicia from the 3D rendering data and GIS information from the 2D GIS system, the 3D graphic indicia being displayed in a geospatial manner as a function of the GIS information.

3. The method according to claim 1, wherein modifying the 2.5D GIS data comprises:
   receiving a message indicating that at least a portion of the 3D graphic indicia has been changed, the message having change information relating to the change of the 3D graphic indicia; and
   in response to receipt of the message, modifying the 2.5D GIS data in the database based on the change information of the message.

4. The method according to claim 3, wherein the 2.5D GIS data is modified substantially in real time as the 3D graphic indicia is modified.

5. The method according to claim 1, wherein modifying the 2.5D GIS data comprises at least one of changing existing information or adding additional information.

6. The method according to claim 1, wherein the 3D graphic indicia includes a three-dimensional visualization display of the 2.5D GIS data.

7. A GIS system comprising:
   a GIS database associated with a 2D GIS system; and
   an interactive 3D interface configured to provide 3D graphic indicia produced by a 3D rendering engine for display on a display device, the graphic indicia being displayed by the 2D GIS system that receives the 3D graphic indicia produced by the 3D rendering engine, the graphic indicia being displayed in a geospatial manner as a function of 2.5D GIS data in a GIS database associated with the 2D GIS system, the interactive 3D interface further configured to modify the 2.5D GIS data in the GIS database using the 3D graphic indicia displayed on the display device, including mapping user selections relating to the 3D graphic indicia to 2D geo-location coordinates for the 2D GIS system and modifying the 2.5D GIS data by the 2D GIS system based on the 2D geo-location coordinates.

8. The GIS system according to claim 7, wherein displaying 3D graphic indicia on a display device comprises:
   providing an interface between the 2D GIS system and a 3D visualization system;
   providing, by the interface, GIS information received from the 2D GIS system to the 3D visualization system;
   providing, by the interface, 3D rendering data from the 3D visualization system to the 2D GIS system; and
   producing, by the 2D GIS system, a display in a 3D window on a display device including 3D graphic indicia from the 3D rendering data and GIS information from the 2D GIS system, the 3D graphic indicia being displayed in a geospatial manner as a function of the GIS information.

9. The GIS system according to claim 7, wherein modifying the 2.5D GIS data comprises:
   receiving a message indicating that at least a portion of the 3D graphic indicia has been changed, the message having change information relating to the change of the 3D graphic indicia; and
   in response to receipt of the message, modifying the 2.5D GIS data in the database based on the change information of the message.

10. The GIS system according to claim 9, wherein the 2.5D GIS data is modified substantially in real time as the 3D graphic indicia is modified.

11. The GIS system according to claim 7, wherein modifying the 2.5D GIS data comprises at least one of changing existing information or adding additional information.

12. The GIS system according to claim 7, wherein the 3D graphic indicia includes a three-dimensional visualization display of the 2.5D GIS data.

13. A computer program product comprising a tangible non-transitory computer-readable medium having embodied therein computer program instructions executable in a GIS system for modifying 2.5D GIS data for a 2D GIS system, the computer program instructions comprising:
   computer program instructions for displaying 3D graphic indicia produced by a 3D rendering engine on a display device, the graphic indicia being displayed by the 2D GIS system that receives the 3D graphic indicia from the 3D rendering engine, the graphic indicia being displayed in a geospatial manner as a function of 2.5D GIS data in a GIS database associated with the 2D GIS system;
   and computer program instructions for modifying the 2.5D GIS data in the GIS database using the 3D graphic indicia displayed on the display device, including mapping user selections relating to the 3D graphic indicia to 2D geo-location coordinates for the 2D GIS system and modifying the 2.5D GIS data by the 2D GIS system based on the 2D geo-location coordinates.

14. The computer program product according to claim 13, wherein the computer program instructions for displaying 3D graphic indicia on a display device comprise:
   computer program instructions for providing an interface between the 2D GIS system and a 3D visualization system;
   computer program instructions for providing, by the interface, GIS information received from the 2D GIS system to the 3D visualization system;
   computer program instructions for providing, by the interface, 3D rendering data from the 3D visualization system to the 2D GIS system; and
   computer program instructions for producing, by the 2D GIS system, a display in a 3D window on a display device including 3D graphic indicia from the 3D rendering data and GIS information from the 2D GIS system, the 3D graphic indicia being displayed in a geospatial manner as a function of the GIS information.

15. The computer program product according to claim 13, wherein the computer program instructions for modifying the 2.5D GIS data comprise:
   computer program instructions for receiving a message indicating that at least a portion of the 3D graphic indicia has been changed, the message having change information relating to the change of the 3D graphic indicia; and
   computer program instructions for modifying the 2.5D GIS data in the database based on the change information of the message.

16. The computer program product according to claim 15, wherein the 2.5D GIS data is modified substantially in real time as the 3D graphic indicia is modified.

17. The computer program product according to claim 13, wherein modifying the 2.5D GIS data comprises at least one of changing existing information or adding additional information.

18. The computer program product according to claim 13, wherein the 3D graphic indicia includes a three-dimensional visualization display of the 2.5D GIS data.

* * * * *